(12) United States Patent
Spruce (10) Patent No.: US 10,422,319 B2
(45) Date of Patent: Sep. 24, 2019

(54) CONTROL METHOD AND SYSTEM FOR WIND TURBINES

(71) Applicant: VESTAS WIND SYSTEMS A/S, Aarhus N (DK)

(72) Inventor: Chris Spruce, Leatherhead (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/580,797

(22) PCT Filed: Jun. 23, 2016

(86) PCT No.: PCT/DK2016/050217
§ 371 (c)(1),
(2) Date: Dec. 8, 2017

(87) PCT Pub. No.: WO2017/000957
PCT Pub. Date: Jan. 5, 2017

(65) Prior Publication Data
US 2018/0223808 A1 Aug. 9, 2018

(30) Foreign Application Priority Data

Jun. 30, 2015 (DK) .................................. 2015 70418

(51) Int. Cl.
*F03D 7/02* (2006.01)
*F03D 17/00* (2016.01)

(52) U.S. Cl.
CPC ........... *F03D 7/0292* (2013.01); *F03D 17/00* (2016.05); *F05B 2270/332* (2013.01); *F05B 2270/335* (2013.01); *Y02E 10/723* (2013.01)

(58) Field of Classification Search
CPC ..... F03D 7/0292; F03D 17/00; Y02E 10/723; F05B 2270/332; F05B 2270/335
See application file for complete search history.

(56) References Cited

U.S. PATENT DOCUMENTS 8,210,052 B1 * 7/2012 Biggs ..................... G01N 3/00
73/808
9,035,479 B1 5/2015 Gates
(Continued)

FOREIGN PATENT DOCUMENTS

CN 101900079 A 12/2010
CN 103946540 A 7/2014
(Continued)

OTHER PUBLICATIONS

PCT Written Opinion of The International Searching Authority for Application No. PCT/DK2016/050217 dated Jun. 23, 2016.
(Continued)

*Primary Examiner* — Kenneth M Lo
*Assistant Examiner* — David J Wynne
(74) *Attorney, Agent, or Firm* — Patterson + Sheridan, LLP (57) ABSTRACT

A method of controlling a wind turbine is provided. The method comprises determining a target fatigue life consumption for each of one or more components of the wind turbine; comparing the target fatigue life consumption with a measure of fatigue life consumption for each of the one or more turbine components; and controlling the turbine power output based upon the comparison. The target fatigue life consumption is determined by combining data indicative of a target rate of accumulation of fatigue damage over at least a portion of the operating life of the wind turbine and data indicative of an expected rate of accumulation of fatigue damage caused by seasonal variations in turbine operating conditions. A corresponding wind turbine controller and wind power plant controller is also provided.

20 Claims, 6 Drawing Sheets

(56) References Cited

U.S. PATENT DOCUMENTS

| | | | |
|---|---|---|---|
| 2006/0095232 A1* | 5/2006 | Purdy | G05B 23/0221 |
| | | | 702/185 |
| 2010/0298995 A1* | 11/2010 | Zhang | F03D 7/0292 |
| | | | 700/287 |
| 2011/0018271 A1* | 1/2011 | Karikomi | F03D 7/0292 |
| | | | 290/44 |
| 2013/0320674 A1 | 12/2013 | Ingram | |
| 2014/0088888 A1* | 3/2014 | Poon | F03B 15/00 |
| | | | 702/34 |
| 2014/0248123 A1 | 9/2014 | Turner et al. | |
| 2014/0288855 A1* | 9/2014 | Deshpande | F03D 17/00 |
| | | | 702/34 |

FOREIGN PATENT DOCUMENTS

| | | | | |
|---|---|---|---|---|
| EP | 2302208 A1 * | 3/2011 | | F03D 7/0224 |
| EP | 2302208 A1 | 3/2011 | | |
| WO | 2013044925 A1 | 4/2013 | | |
| WO | WO-2013044925 A1 * | 4/2013 | | F03D 7/0292 |
| WO | 2015189032 A2 | 12/2015 | | |
| WO | WO-2015189032 A2 * | 12/2015 | | F03D 7/0292 |

OTHER PUBLICATIONS

Danish Patent and Tradmark Office Search Report for Application No. PA 2015 70418 dated Feb. 1, 2016.
International Search Report for Application No. PCT/DK2016/050217 dated Sep. 21, 2016.

* cited by examiner

CONTROL METHOD AND SYSTEM FOR WIND TURBINES

Embodiments of the present invention relate to methods and control systems for use in protecting a wind turbine from excessive wear of components.

Figure 1A:
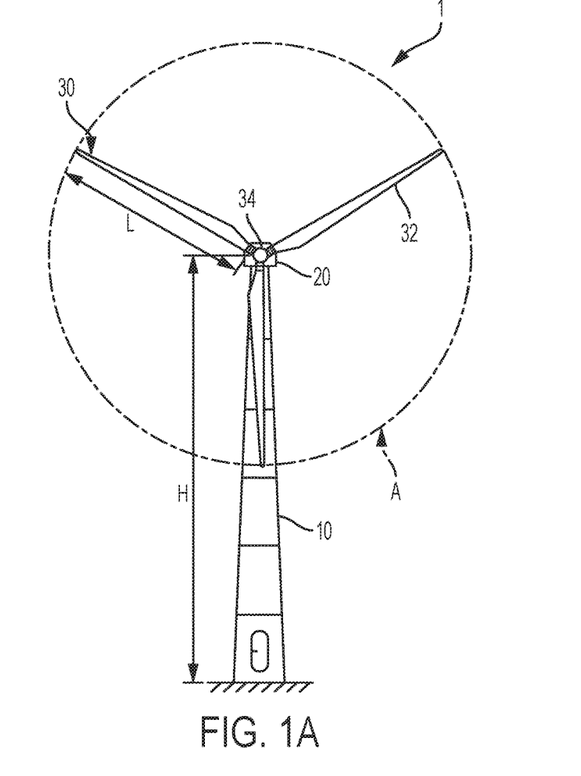
FIG. 1A is a schematic front view of a conventional wind turbine.

FIG. 1A illustrates a large conventional wind turbine 1, as known in the art, comprising a tower 10 and a wind turbine nacelle 20 positioned on top of the tower 10. The wind turbine rotor 30 comprises three wind turbine blades 32 each having a length L. The wind turbine rotor 30 could comprise another number of blades 32, such as one, two, four, five, or more. The blades 32 are mounted on a hub 34 which is located at a height H above the base of the tower. The hub 34 is connected to the nacelle 20 through a low speed shaft (not shown) extending from the front of the nacelle 20. The low speed shaft drives a gearbox (not shown) which steps up the rotational speed and, in turn, drives an electrical generator within the nacelle 20 for converting the energy extracted from the wind by the rotating blades 32 into electrical power output. The wind turbine blades 32 define a swept area A, which is the area of a circle delineated by the rotating blades 32. The swept area dictates how much of a given air mass is intercepted by the wind turbine 1 and, thus, influences the power output of the wind turbine 1 and the forces and bending moments experienced by the components of the turbine 1 during operation. The turbine may stand onshore, as illustrated, or offshore. In the latter case the tower will be connected to a monopile, tripod, lattice or other foundation structure, and the foundation could be either fixed or floating.

Each wind turbine has a wind turbine controller, which may be located at the tower base or tower top, for example. The wind turbine controller processes inputs from sensors and other control systems and generates output signals for actuators such as pitch actuators, generator torque controller, generator contactors, switches for activating shaft brakes, yaw motors etc.

Figure 1B:
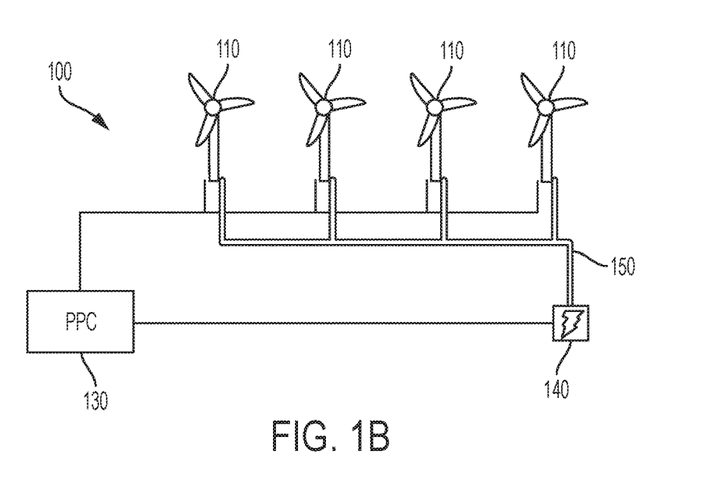
FIG. 1B is a schematic representation of a conventional wind power plant comprising a plurality of wind turbines.

FIG. 1B shows, schematically, an example of a conventional wind power plant 100 comprising a plurality of wind turbines 110, the controller of each of which communicates with a power plant controller (PPC) 130. The PPC 130 can communicate bi-directionally with each turbine. The turbines output power to a grid connection point 140 as illustrated by the thick line 150. In operation, and assuming that wind conditions permit, each of the wind turbines 110 will output maximum active power up to their rated power as specified by the manufacturer.

Figure 2:
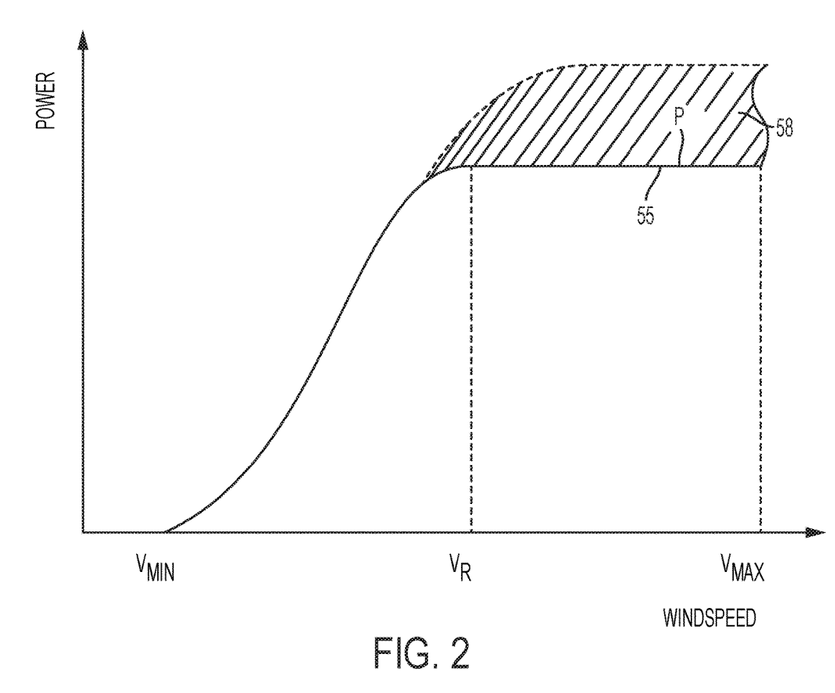
FIG. 2 is a graph illustrating a conventional power curve of a wind turbine.

FIG. 2 illustrates a conventional power curve 55 of a wind turbine plotting wind speed on the x axis against power output on the y axis. Curve 55 is the normal power curve for the wind turbine and defines the power output by the wind turbine generator as a function of wind speed. As is well known in the art, the wind turbine starts to generate power at a cut-in wind speed $V_{min}$. The turbine then operates under part load (also known as partial load) conditions until the rated wind speed is reached at point $V_R$. At the rated wind speed the rated (or nominal) generator power is reached and the turbine is operating under full load. The cut-in wind speed in a typical wind turbine may be 3 m/s and the rated wind speed may be 12 m/s, for example. Point $V_{max}$ is the cut-out wind speed which is the highest wind speed at which the wind turbine may be operated while delivering power. At wind speeds equal to, and above, the cut-out wind speed the wind turbine is shut down for safety reasons, in particular to reduce the loads acting on the wind turbine. Alternatively the power output may be ramped down as a function of windspeed to zero power.

The rated power of a wind turbine is defined in IEC 61400 as the maximum continuous electrical power output that a wind turbine is designed to achieve under normal operating and external conditions. Large commercial wind turbines are generally designed for a lifetime of 20 to 25 years and are designed to operate at the rated power so that the design loads and fatigue life of components are not exceeded.

The fatigue damage accumulation rates of individual components in wind turbines vary substantially under different operating conditions. The rate of wear, or accumulation of damage, tends to increase as generated power increases. Wind conditions also affect rate of accumulation of damage. For some mechanical components, operation in very high turbulence causes a rate of accumulation of fatigue damage that is many times higher than in normal turbulence. For some electrical components, operation at very high local temperatures, which may be caused by high ambient temperatures, causes a rate of accumulation of fatigue damage, such as insulation breakdown rate, that is many times higher than in normal temperatures. As an example, a rule of thumb for generator windings is that a 10° C. decrease in winding temperature increases lifetime by 100%.

Recently progress has been made in controlling turbines such that they can produce more power than the rated power as indicated by shaded area 58 of FIG. 2. The term "over-rating" is understood to mean producing more than the rated active power during full load operation by controlling one or more turbine parameters such as rotor speed, torque or generator current. An increase in speed demand, torque demand and/or generator current demand increases additional power produced by over-rating, whereas a decrease in speed, torque and/or generator current demand decreases additional power produced by over-rating. As will be understood, over-rating applies to active power, and not reactive power. When the turbine is over-rated, the turbine is run more aggressively than normal, and the generator has a power output which is higher than the rated power for a given wind speed. The over-rating power level may be up to 30% above the rated power output, for example. This allows for greater power extraction when this is advantageous to the operator, particularly when external conditions such as wind speed, turbulence and electricity prices would allow more profitable power generation.

Over-rating causes higher wear or fatigue on components of the wind turbine, which may result in early failure of one or more components and require shut down of the turbine for maintenance. As such, over-rating is characterised by a transient behaviour. When a turbine is over-rated it may be for as short as a few seconds, or for an extended period of time if the wind conditions and the fatigue life of the components are favourable to over-rating.

Existing control techniques tend to focus on responding directly to measurements of turbine conditions. U.S. Pat. No. 6,850,821 discloses a wind turbine controller that uses measured stress conditions as an input allowing control of the output power as a function of measured stress. Thus, for example, power output may be reduced in very turbulent wind conditions in comparison to less turbulent conditions having the same average wind speed. US-A-2006/0273595 discloses intermittently operating a wind power plant at an increased rated power output based on an assessment of operating parameters with respect to component design ratings and intermittently increasing the output power of a wind turbine based on the assessment. EP-1,911,968 describes a wind turbine control system in which a turbine is operated within rated power levels using feedback from a continuous-time damage model that calculates the rate at which damage is accumulated at any time.

Lifetime Usage Estimators may be used in ensuring the fatigue load limits of all turbine components remain within their design lifetimes. The loads a given component experiences (be they bending moments, temperatures, forces or motions for example) may be measured and the amount of component fatigue life consumed calculated, for example using a technique such as a rainflow count and Miner's rule or a chemical decay equation. Based on Lifetime Usage Estimators, individual turbines can then be operated in such a way as to not exceed their design limits. A device, module, software component or logical component for the measuring of the fatigue life consumed for a given turbine component may also be referred to as its Lifetime Usage Estimator, and the same acronym (LUE) will be used to refer to the algorithm for determining a lifetime usage estimate and the corresponding device, module or software or logic component.

Lifetime usage estimators provide a useful indication of the amount of wear experienced by a given component. However, it has been appreciated that simply using LUEs in wind turbine control applications, whereby turbine power output is controlled based on lifetime usage estimates, is sub-optimal, particularly because such control only takes into account expected rate of damage accumulation over the entire lifetime of the turbine.

A particular method of controlling a wind turbine in response to damage incurred in turbine components is described in WO 2013/044925. A controller for a wind turbine includes a turbine optimiser and a lifetime usage estimator. The turbine optimiser outputs set-points for operating parameters of the wind turbine based on a power demand input and an input from the lifetime usage estimator. The lifetime usage estimator calculates a measure of the fatigue life consumed by each of a plurality of turbine components based on a lifetime usage algorithm for each component, the lifetime usage algorithms operating on values of variables affecting the fatigue lifetime of the components, the values being obtained from sensors on the wind turbine. The lifetime usage calculations can be implemented on a turbine that has already been in service by using historical data, and appropriate calculations, to determine estimates of initial values for the lifetime usage estimators.

The present invention aims to provide improved methods and apparatus for controlling wind turbines to provide additional protection against premature ageing and fatigue-damage accumulation when using LUEs.

SUMMARY OF THE INVENTION

The invention is defined in the independent claims to which reference is now directed. Preferred features are set out in the dependent claims.

Embodiments of the invention generally relate to the use of Lifetime Usage Estimators (LUEs) in various control scenarios. By definition, LUEs are looking at periods over an entire turbine lifetime, typically 20 to 25 years. Changes in rate of accumulation of fatigue damage are relatively small from year-to-year, but normally have large variations from month to month or season to season. It has been appreciated that, when LUEs are used in turbine control functions, the control performance may be substantially suboptimal if LUEs are used immediately after commissioning the control function, with no initialisation. For example, if used for over-rating control, and the over-rating control is commissioned in the middle of a northern hemisphere Winter, high wind conditions will suppress all over-rating for close to three seasons. The financial value of generation in the early years of a project is disproportionally high, and therefore it is valuable to have an intelligent control strategy that allows for the earliest possible use of over-rating, or other LUE based turbine control, that avoids unnecessarily restricting power generation.

According to a first aspect of the invention there is provided a method of controlling a wind turbine, the method comprising: determining a target fatigue life consumption for each of one or more components of the wind turbine; comparing the target fatigue life consumption with a measure of fatigue life consumption for each of the one or more turbine components; and controlling the turbine power output based upon the comparison. The target fatigue life consumption is determined by combining data indicative of a target rate of accumulation of fatigue damage over at least a portion of the operating life of the wind turbine and data indicative of an expected rate of accumulation of fatigue damage caused by seasonal variations in turbine operating conditions.

Controlling a wind turbine according to this method has the advantage that seasonal variations in fatigue damage are taken into account when controlling turbine power output from the point of activating the control method. This avoids an initialisation period during which power output control based on fatigue life consumption cannot be reliably performed. This also improves on existing methods by taking into account seasonal variations in fatigue life consumption from the point of activating the control method.

Optionally controlling the turbine power output produced comprises controlling the power level to which the wind turbine is over-rated. Optionally the method further comprises reducing or preventing over-rating of the turbine if the fatigue life consumed by a component is greater than the target consumption for that component.

Optionally the data indicative of a target rate of accumulation of fatigue damage is obtained from a schedule defining the target rate of accumulation of fatigue damage for each of a plurality of periods of time over at least a portion of the operating life of the wind turbine. Optionally each of the plurality of periods of time is a year, or a multiple thereof. In addition, or alternatively, the schedule defining the target rate of accumulation of fatigue damage is determined by an operator.

Optionally the method further comprises determining measures of the fatigue life consumed by the one or more turbine components by: obtaining one or more signals, or values of variables, that indicate the fatigue lifetime of the one or more wind turbine components from turbine sensors; and applying one or more lifetime usage estimator algorithms to the signals or values to determine measures of the fatigue life consumed by each of the turbine components. Optionally, the sampling period for the one or more signals, or values of variables, is between 10 ms and 4 seconds.

Optionally the data indicative of an expected rate of accumulation of fatigue damage is obtained from a schedule defining the expected seasonal rates of accumulation of fatigue damage. Optionally the seasonal schedule comprises expected values for variations in rates of accumulation of fatigue damage for each of a plurality of periods of time, the periods being the same duration, or shorter than, a season. In addition, or as an alternative, the seasonal schedule contains values indicating the percentage or fraction by which the target damage accumulation is increased or decreased for a given period of time depending upon seasonal variation.

Optionally the seasonal schedule is derived from environmental data for the site on which the wind turbine is located and/or the site on which a wind power plant that includes the wind turbine is located and/or the sites on which one or more nearby wind power plants are located. The data may include one or more of: wind speed, wind direction, turbulence intensity, air density, icing and site topography and terrain for the site or sites; and/or operating data for energy produced and other measures.

Optionally the method is initiated at a point in time after commissioning of the wind turbine. The site data may include: one or more of wind speed, wind direction, turbulence intensity, air density, icing and site topography and terrain for the site or sites since commissioning; and/or operating data for energy produced and other measures since commissioning.

Optionally the seasonal schedule is further derived using values from the output of one or more lifetime usage estimator algorithms. The seasonal schedule may be derived by combining the site data and the values from the output of the one or more lifetime usage estimator algorithms according to a weighting. The weighting towards the lifetime usage estimator values may increase as additional data from the one or more lifetime usage estimator algorithms is obtained.

Optionally, the site data is obtained prior to constructing, and/or prior to commissioning, the wind turbine or wind power plant.

Optionally, determining a target fatigue life consumption for each of one or more components of the wind turbine and comparing the target fatigue life consumption with a measure of fatigue life consumption for each of the one or more turbine components is performed with a sampling rate of between once every 10 minutes and once per day. Optionally the sampling rate is once every hour, or once per day.

According to a second aspect of the invention there may also be provided a controller for a wind turbine, the controller being configured to: determine a target fatigue life consumption for each of the one or more components of the wind turbine; compare the target fatigue life consumption with a measure of fatigue life consumption for each of the one or more turbine components; and control the turbine power output based upon the comparison. The controller is configured to determine the target fatigue life consumption by combining data indicative of a target rate of accumulation of fatigue damage over at least a portion of the operating life of the wind turbine and data indicative of an expected rate of accumulation of fatigue damage caused by seasonal variations in turbine operating conditions.

According to a third aspect of the invention a corresponding controller for a wind power plant may also be provided.

According to a fourth aspect there is provided a corresponding computer program that when executed on a wind turbine controller or wind power plant controller causes it to carry out any of the methods described herein.

BRIEF DESCRIPTION OF THE DRAWINGS

The invention will now be further described by way of example only and with reference to the accompanying figures in which.

DETAILED DESCRIPTION OF PREFERRED EMBODIMENTS

Embodiments of the invention will be described that make use of Lifetime Usage Estimators (LUEs) in various control scenarios. This includes the use of Lifetime Usage Estimators in: over-rating control; non-over-rating controls, e.g. de-rating to avoid actual turbine life being less than design life; and functions which do not involve closed-loop control, e.g. maintenance scheduling. In particular, embodiments relate to the initialisation of control functions that use LUEs.

Figure 3:
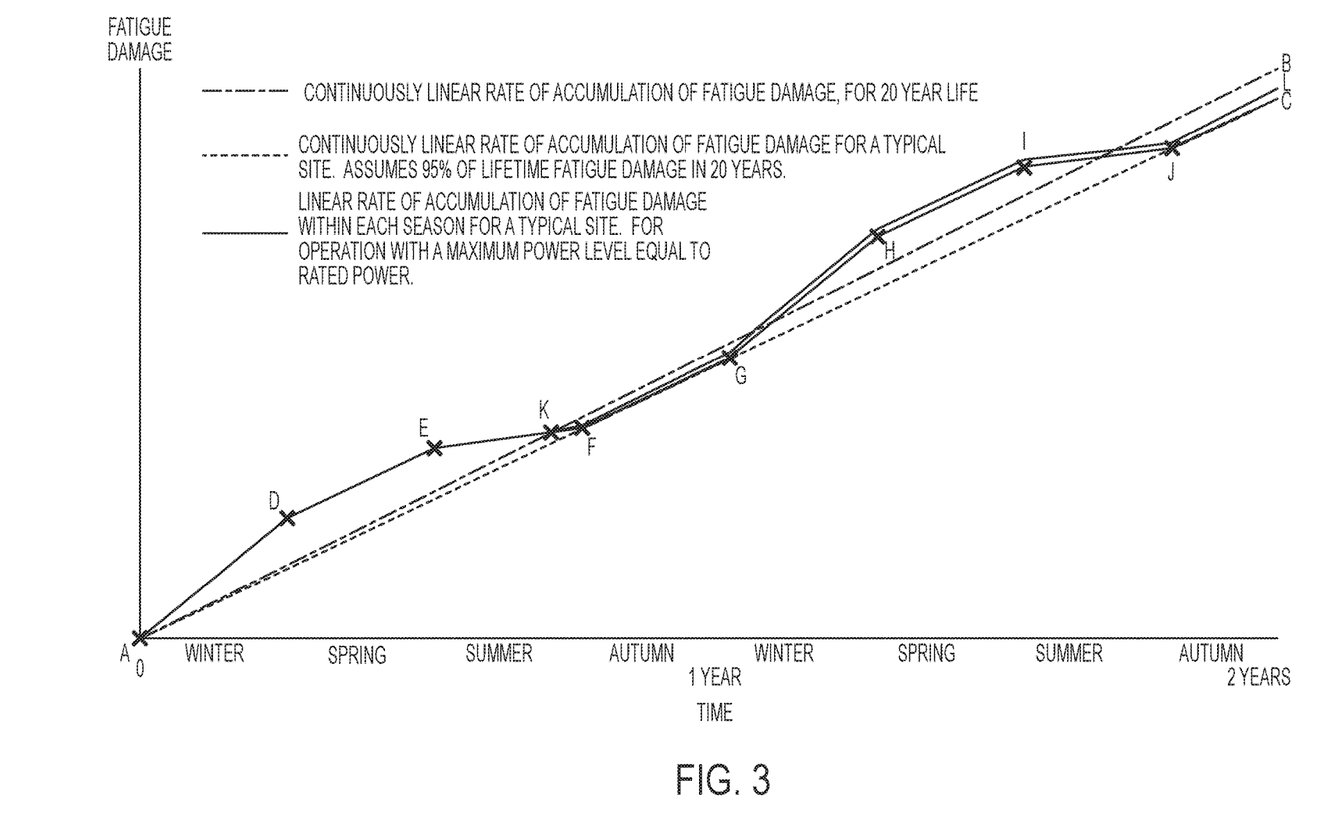
FIG. 3 is a graph illustrating fatigue damage incurred by an example turbine component over a period of two years with and without over-rating control.

FIG. 3 shows an example of the fatigue damage that can be incurred by an example wind turbine component over a period of two years. The line from point A to point B defined by alternating dots and dashes represents the continuously linear rate of accumulation of fatigue damage, over a 20 to 25 year life span. This line indicates fatigue damage accumulating at a linear rate and at the design rate, i.e. 100% of the fatigue life will have been used when the turbine lifetime has been reached. The line from point A to point C, defined by evenly spaced dashes represents an example of the continuously linear rate of accumulation of fatigue damage for a typical wind turbine power plant site, in which 95% of lifetime fatigue damage occurs over a 20 to 25 year life span. This line indicates fatigue accumulating at a more realistic rate for a real site, giving 95% utilisation of fatigue life over the turbine lifetime.

It should be noted that FIG. 3 is a schematic for illustrative purposes, in particular the y-axis is shown as "Fatigue damage", whereas in practice this might be "maximum fatigue damage in a component", and the component with the maximum fatigue damage might vary as time passes. However this would not materially affect the shape of the graphs.

An example of the accumulation of fatigue damage over two typical years, for a wind power plant in the northern hemisphere, is shown by the continuous line running through points A-D-E-F-G-H-I-J-C. This line represents normal operation on a typical site, i.e. operation at a maximum power level equal to rated power. This plot is for the case in which operation commences at the start of a Winter period. As can be seen, a greater amount of fatigue damage is incurred during seasons having higher average wind speeds, particularly during Winter. Rate of accumulation of fatigue damage may be higher than the expected linear 20 to 25 year rate during Winter, lower in Summer, and approximately equal during Spring and Autumn. In the example of FIG. 3 the long-term design life trend is exceeded initially, during A-D-E-K, because the first season of operation is Winter. This is not a problem however because after one year of operation, point G, the fatigue damage is 95% of the design value.

The turbine controller of WO 2013/044925 describes a turbine optimiser that compares the proportion of the fatigue life consumed by the components with a target consumption based on the age of the component, and prevents over-rating of the turbine if the fatigue life consumed by any component is greater than the target consumption for that component. In another example the turbine optimiser compares the proportion of the fatigue life consumed by the most damaged components with a target consumption based on the age of that component and prevents over-rating of the turbine if the fatigue life consumed is greater than the target consumption for that component. These are examples of a control function in which power output of the turbine is controlled using a power level signal that depends upon the fatigue life consumed by components of the turbine. Such control methods, whether they are implemented at the wind turbine controller, at the power plant controller, or at any other location, may be used in any embodiments of the invention.

A wind turbine controller that alters power output, such as over-rated power output, based on a measure of fatigue life consumption may assume a continuously linear accumulation of fatigue damage over the 20 to 25 year lifetime, for example. The fatigue damage curve that will be followed for such an over-rating control strategy is also shown in FIG. 3. This follows line A-D-E-F initially, but then diverges at point K and follows the line marked "L", which can be seen as having fatigue damage values just above the F-G-H-I-J-C line. This controller targets a linear rate of accumulation of fatigue damage over 20 to 25 years. As a result it does not over-rate the wind turbine until point K, thereby illustrating the disadvantage of simply targeting a linear rate of accumulation of fatigue damage over the lifetime.

After point K, the portions where the line "L" is below line A-B (the line of alternating dots and dashes) indicate periods in which over-rating takes place, and the portions above line A-B illustrate when over-rating does not take place. It is assumed in FIG. 3 that the over-rating gives a rate of accumulation of fatigue damage, during winds of above rated wind-speed, that is approximately 15% higher than in normal operation. Note that over-rating only takes place for about 20-35% of the total time on most sites. It can be seen that across the first 2 years of operation, relatively little over-rating takes place, and very little takes place in the Winter months, because this would lead to fatigue damage above the linear fatigue damage model. However, periods of above average fatigue damage may be offset by periods of below average fatigue damage, allowing the turbine components to ultimately stay within the design envelope. This represents a lost opportunity for additional power production that may be particularly important to the turbine operator during the initial operation phase of a wind power plant.

The design envelope consists of the range of operating parameters within which the turbine is designed to operate (operational design envelope) or survive (survival design envelope). For example, the operational design envelope for the operating parameter gearbox oil temperature may be 10° C. to 65° C., that is, if the gearbox oil temperature moves outside this range then then turbine will be outside its operational design envelope. In this case, the turbine is protected by alarms (referred to in IEC 61400-1 as 'protection functions') and will shut down if the gearbox oil temperature moves outside this range. As well as being defined by real-time operating limits, such as temperatures and electrical current limitations, the operational design envelope may also, or alternatively, be defined by the loads, including fatigue-loads, used to design the mechanical components and parts of the electrical components; i.e. the "design loads".

Over-rating exploits the gap that typically exists between the component design-loads and the loads experienced by each turbine in operation, which is typically more benign then the IEC-standard simulated conditions for which the design loads were calculated. Over-rating causes the power demand for the turbine to be increased in high winds until either an operating limit specified by an operational constraint (temperature, etc.) is reached, or until an upper power limit is reached that has been set to prevent component design loads from being exceeded. Operational constraints limit the possible over-rating set point signal as a function of various operating parameters. For example, where a protection function is in place to initiate shut down when the gearbox oil temperature exceeds 65° C. as mentioned above, an operational constraint may dictate a linear decrease in the maximum possible over-rating set point signal as a function of gearbox oil temperature for temperatures over 60° C., reaching "no over-rating possible" (i.e., a power set-point signal equal to rated power) at 65° C.

One solution to the problem of unnecessary power suppression in LUE based control functions is to use an initialisation period. Embodiments described herein provide an alternative solution.

According to an aspect of the invention, an improved controller may be provided. The improved controller may avoid the need to initialise LUE values. In particular, the improved controller avoids the use of an extended period for initialisation of LUE values, and consequently allows higher energy production in the crucial early years following deployment of over-rating control.

Generally, the controller implements a control method for controlling power output by a wind turbine. The control method includes determining a target fatigue life consumption for each of one or more components of the wind turbine; comparing the target fatigue life consumption with a measure of fatigue life consumption for each of the one or more turbine components; and controlling the amount of power produced based upon the comparison. The general control method may be similar to that described in the abovementioned WO 2013/044925. However, according to the first aspect, the target fatigue life consumption is determined by combining data indicative of a target rate of accumulation of fatigue damage over at least a portion of the operating life of the wind turbine and data indicative of an expected rate of accumulation of fatigue damage caused by seasonal variations in turbine operating conditions.

Figure 4:
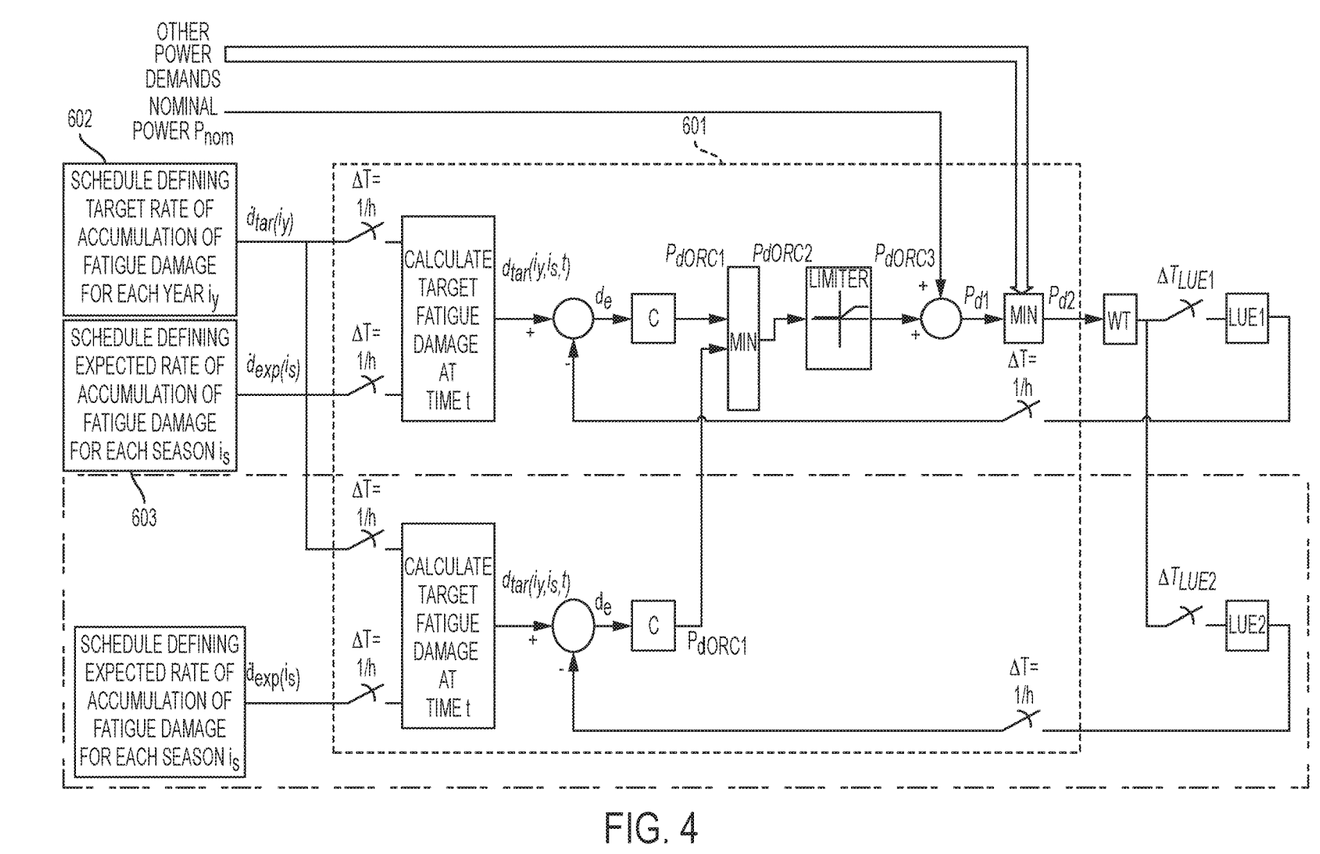
FIG. 4 is an example of a controller according to a second aspect of the invention.

FIG. 4 shows an example of a controller 601, which is used as an over-rating controller, to control the level of power produced when over-rating the wind turbine. The controller receives, as input, data from schedules 602 and 603. The schedules may be in the form of tables stored in memory accessible by the controller and containing sets of values. Schedule 602 is applied to all components for which an LUE is used in the controller while schedule 603 is component-specific. Alternatively, a specific schedule 602 may be provided for each component.

Schedule 602 defines the target rate of accumulation of fatigue damage for at least a portion of the turbine life. For example, the target rate may be defined for each period of a set of periods of time. In the example of FIG. 4 the target rate is set on an annual basis, and the schedule may comprise a set of values defining the target rate of accumulation of fatigue damage for each year. Of course, other time periods may be used. For example, the schedule may have values set for every 18 months or every two years. The input received by the controller, $\dot{d}_{tar}(i_y)$, is the target rate of accumulation of fatigue damage for the present year, $i_y$, at the sampling time.

The operator can define a schedule of rate of accumulation of fatigue damage for each year of the turbine's life that remains. The rate of life used can be linear, i.e. $\dot{d}_{tar}$ is the same for every year $i_y$. Alternatively, for example, the target rate of life used can be set high for the early years of operation, to boost power output in the valuable early years. As a particular example, for a 20 year life, more than 5% lifetime usage would be targeted in each of the first years of operation. To compensate for this, the target life could be modified to less than 5% lifetime usage in later years.

Schedule 603 defines the expected rate of accumulation of fatigue damage for each season, for one component, here shown as "LUE1". The expected rate indicates how rate of accumulation of fatigue damage is expected to vary due to seasonal variations in turbine operating conditions. The schedule can be viewed as a model detailing the seasonal variation of rate of accumulation of fatigue damage and may be turbine site specific. The input received by the controller, $\dot{d}_{exp}(i_s)$, is the expected relative rate of accumulation of fatigue damage for the present season, $i_s$, at the sampling time.

The schedule 603 for each season may be determined based upon historical data for the site, and is dependent upon one or more of the following factors: wind speed, wind direction, turbulence intensity, air density, icing (monitored for example based on change of weight of blade using load sensors) and topography and terrain of site. The expected relative rate of accumulation of fatigue damage for season $i_s$, $\dot{d}_{exp}(i_s)$, may be calculated off-line prior to operation of the controller. Example values for the schedule defining expected variations in rate of accumulation of fatigue damage for one component, for the purposes of illustration, are as follows:

Season 1 (Winter): +0.9%
Season 2 (Spring): 0%
Season 3 (Summer): −1.0%
Season 4 (Autumn): +0.1%

These values represent a percentage or fractional change in the damage incurred above the annual average for the component. The values indicate the respective relative rate of accumulation of fatigue damage between seasons.

It should be noted that although the expected rate of accumulation of fatigue damage for each season provides a measure of how rate of accumulation of fatigue damage varies from season to season, a finer granulation of time periods may be used to that of whole seasons. In particular, time periods shorter than a season may be used, such as month-to-month data, as long as care is taken to avoid large jumps from month-to-month if historical data available to populate the table is sparse.

Identification of the values for $\dot{d}_{exp}(i_s)$ may use historical data for the specific turbine site and/or data from other wind power plants. For a wind turbine that will run the controller from the time of commissioning, pre-construction data may be used to identify the expected shape of the LUE usage rate over the chosen time periods (e.g. season-to-season or month-to-month). Where a retrofit is being applied of the controller software to an existing wind turbine, for example some years after the time of commissioning the turbine, the same approach can be used, but with wind turbine and/or wind power plant operational data, such as that stored in a SCADA system, being used instead of, or in addition to, pre-construction data.

The seasonal variation schedule for a given turbine component can be determined using existing standard tools such as turbine siting programs. Such programs may calculate various parameters relating to a wind turbine's operating conditions by performing a range of different calculations which may be run in a computer simulation of a wind turbine. For example, the schedule calculation may include test cases for winds at seasonal average speeds and seasonal average durations, for different wind directions, for different wind turbulences, and so on. As will be appreciated, there are many different wind speeds, wind conditions, and/or wind turbine operating conditions for which there are test cases to be run in the wind turbine simulation of the fatigue damage schedule. The simulation may also take into account site topography. The test cases may include real, actual, site data or artificial data (e.g. for operation at wind-speeds close to the upper cut-out wind-speed which are experienced rarely). The simulation may calculate or determine the seasonal fatigue damage schedule incurred by the various components in the wind turbine based on simulation determined loads affecting those components of the wind turbine.

Optionally, after operating the turbine for a period of time, there may then be a change in the schedule 603 from using the expected rate determined as indicated above, to using the rate determined in accordance with the LUEs operating as part of the controller as described below. The LUEs provide a direct measurement of fatigue life usage and can therefore be used to provide a more specific schedule of seasonal specific rates of accumulation of fatigue damage. This changeover may occur after a predetermined period of time, for example one year or more of operation, or after commissioning of LUE based control. The shift may be tapered from the initial expected rate to the LUE determined rate.

In one particular example the schedule value for expected rate of accumulation of fatigue damage at a given time could be determined using both historical data for the site and LUE derived values. For example, the expected rate of accumulation of fatigue damage for a given period of time according to the schedule may be calculated as an average between the expected rate based on historical site data and the expected rate based on LUE data. A weighting could be applied to the values obtained by both methods, and a weighted average used.

The weightings applied to the values obtained by historical data for the site and LUE derived values can vary with time. As more data is accumulated by the LUEs, a greater weighting can be placed on the values obtained according to this method, and a lesser weighting can be placed on the values obtained using siting programs and/or pre-construction data. The weighting applied may be directly dependent upon the time span of available data according to the particular method. For example, if 2 years of pre-construction/site data is available and only one year of LUE data is available then the weighting may be applied 2:1 in favour of the value determined using site data. As the time span for data available using LUEs increases, the weighting towards LUE derived values increases, and the relative weighting towards site based data decreases.

The data from which the schedule 603 is determined may be insufficient for a number of reasons. For example, the pre-construction or pre-commissioning data available for a given turbine may be insufficient, e.g. less than a full year's worth of data is available. Alternatively, or in addition, a given turbine may be subject to delayed construction and/or is commissioned later than other turbines, or experiences substantial early downtime, with the result being that the LUE data for that turbine may not yet be an accurate indicator of expected rate of accumulation of fatigue damage for the different seasons.

In order to supplement the schedule 603, information from LUEs associated with one or more other turbines may be used to give a generally more accurate estimate for values of $\dot{d}_{exp}(i_s)$.

The LUE information may be taken from one or more other turbines in the same vicinity as the turbine in question. This may apply particularly to turbines located on the same wind power plant site, but useful information could be obtained for turbines within the same geographical vicinity where seasonal variations in operating conditions such as wind speed and air density are similar. The same geographical vicinity may include turbines up to 100 km from the turbine in question, for example.

Preferably the turbines used to provide additional LUE based data are of the same type as the turbine in question.

As a further optional feature, the LUE data from one or more other turbines may be used to define the shape, or relative variation, of the expected LUE fatigue life usage rate for a given turbine of interest.

Figure 5:
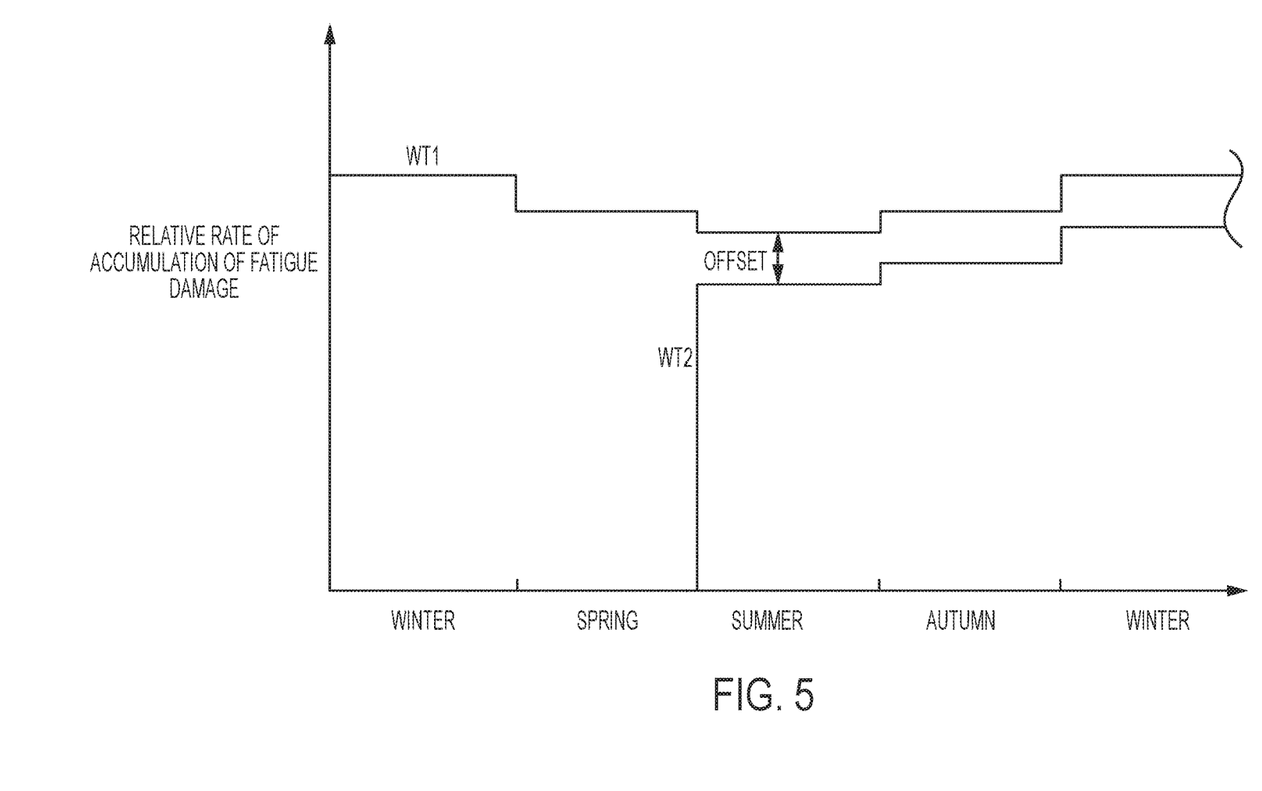
FIG. 5 is a graph illustrating fatigue damage incurred by a first turbine and its use in estimating fatigue damage incurred by a second turbine.

FIG. 5 shows an example graph in which the relative rate of accumulation of fatigue damage for each season is shown for a first turbine, WT1. The rate of accumulation of fatigue damage is determined using one or more LUEs applied to that turbine. Whilst not shown, data regarding rate of accumulation of fatigue damage for WT1 may have been accrued for one or more previous years to provide a full year of data regarding seasonal variations in rate of accumulation of fatigue damage.

A second turbine, WT2, experiences a period of downtime, shown for Winter and Spring in this example. The downtime may be due to a fault with the turbine or because the turbine was delayed in being commissioned, among other reasons.

Rather than relying on pre-construction site data to determine a schedule 603 of expected rate of accumulation of fatigue damage for WT2, the LUE data from WT1 may be used to provide a schedule, on the assumption that the relative rates of accumulation damage for the seasons will be similar for WT1 and WT2. Optionally, an offset may be used to compensate for differences of rate of accumulation of fatigue damage between turbines. The offset value will depend upon whether the turbine of interest, WT2, is likely to incur fatigue damage at a lower or higher rate than WT1. This offset will depend upon the position of WT2 relative to WT1 within the wind power plant, and may therefore be determined based on site information, optionally including topographic information.

Average rates of accumulation of fatigue damage are shown in FIG. 5 for each season. The time periods may be shorter in duration, such as monthly.

LUE information from the turbine WT1 and/or other turbines in the same vicinity may be combined with pre-construction site data in the manner described above to arrive at a more accurate schedule 603 if required.

The target fatigue for a given time is calculated from the two schedules 602 and 603 at particular sampling times, and is compared with the LUE values on a component by component basis. The difference of the target values with respect to the LUE values is used to control the power output of the wind turbine. A specific example of how this can be achieved is described below.

With reference to the rest of the controller 601, two inputs from schedules 602 and 603 are sampled periodically at the controller time-step ΔT. It should be noted that the angled lines with arcs through them indicate samplers with constant sampling rates. The target fatigue damage at a given time is calculated by combining the controller specified target rate of accumulation of fatigue damage with the seasonal variation expected. The target fatigue damage may be modified according to the seasonal expected rate of accumulation. The output, $d_{tar}(i_y, i_s, t)$, is the target fatigue damage for time t in season $i_s$ in year $i_y$. An example follows:

Component is gearbox bearings.

$$\dot{d}_{tar}(i_y) = [6\% \ 5.9\% \ 5.8\% \ldots]$$

$$\dot{d}_{exp}(i_s) = [+0.9\% \ 0 \ -1\% \ +0.1\%], \text{ where:}$$

Season 1 is Winter
Season 2 is Spring
Season 3 is Summer
Season 4 is Autumn

Turbine commissioning date=first day of Winter season
Time t=mid-point of Autumn of $3^{rd}$ year of operation
Then:

$$\begin{aligned} d_{tar}(i_y, i_s, t) &= \text{(year 1 fatigue target)} + \text{(year 2 fatigue target)} + \\ & (3.5/4) * \text{(year 3 fatigue target)} + \text{(season 1 expected} \\ & \text{fatigue offset)} + \text{(season 2 expected fatigue offset)} + \\ & \text{(season 3 expected fatigue offset)} + 0.5 * \text{(season 4} \\ & \text{expected fatigue offset)} \\ &= 6\% + 5.9\% + (3.5/4) * 5.8\% + 0.9\% + 0\% - 1\% + \\ & 0.5 * 0.1\% \\ &= 16.925\% \end{aligned}$$

The target fatigue damage $d_{tar}(i_y, i_s, t)$, is then used to control the power produced by the turbine. The target fatigue damage at time t is compared with the actual damage, determined using LUE1, by a comparator which gives a value $d_e$, the fatigue damage error signal. This is fed to a controller "C" which converts the fatigue damage error into a power demand $P_{dORC1}$. This may be achieved using standard control theory, for example by multiplying $d_e$ by the inverse of the open loop gain and then applying a control law such as proportional-integral (PI) control. In the example of FIG. 4, the power demand $P_{dORC3}$ indicates the maximum desired overrating to be applied by the turbine. This power demand may be a value from 0% to 100%, where 0% is no over-rating and 100% is maximum permissible over-rating, or may be expressed in units of power, e.g. kilowatts. In other examples, where the controller is used for other control strategies that trade off fatigue damage and power demand, the power demand may instead be an indication of the amount of de-rating to be applied to a turbine.

The process described above is performed for one or more additional LUEs at the same time, as indicated in FIG. 4. The same target rate of accumulation of fatigue damage may be used across the different LUEs, but with different schedules of expected seasonal rate of accumulation of fatigue damage for each component. The schedule of expected rate of accumulation of fatigue damage depends upon the susceptibility of the different components to seasonal variation in damage accumulation. Components whose fatigue is highly wind dependent will have accentuated seasonal variations, with greater fatigue accumulation during the high wind months, and less during the low wind months. Such components that are highly wind dependent could be the gear teeth and yaw system for example. In contrast, some components have their fatigue accumulation dominated by factors other than wind speed/turbulence etc. One example is the blade edgewise flap fatigue which is dominated by load reversals incurred from moving between horizontal position orientations as the blades rotate. In this instance fatigue damage is affected primarily by the number of revolutions per minute of the rotor. Whilst the rotor will rotate a few more times in high wind conditions, this does not have a large impact on the fatigue damage. As such, the variations over the different seasons in fatigue damage accumulation will be much less pronounced for such components.

The minimum power demand across the various LUEs is selected, the value being $P_{dORC2}$, and a limiter function may then be applied. The function of the limiter is to restrict the overrating to a maximum value of 100%, since if the LUE value is particularly low, the error in fatigue damage could lead to an overrating amount greater than 100%. The limited overrating power demand is then added to the turbine nominal power demand $P_{nom}$. The resulting power demand $P_{d1}$ may optionally be fed into a block "MIN", which selects the minimum power demand out of all the different power demands that may be applied to the turbine, where other power demands are applied. This may include grid operator specified power demands, for example power curtailment, and local site manager instructions for power demand etc. The output from the "MIN" block, $P_{d2}$, represents the final power demand that is sent to the turbine controller or used by the turbine controller (inside the block WT), to control the amount of power produced by the wind turbine. Such control may be achieved by controlling one or more of the three pitch angles of the turbine, and/or the generator current for example.

The controller of FIG. 4 may use various time-steps. The time-step $\Delta T$ is once per hour in the example of FIG. 4, but other values may be used.

It is desirable for the time-step $\Delta T$ to be short compared to a season, which here is a period of generally consistent operating conditions rather than necessarily a three month period. The minimum duration of a season may, for example, be a month. In this case the time-step $\Delta T$ would need to be short relative to a month, to give a satisfactory closed-loop performance, which generally requires a minimum of around 20 time-steps to occur within that period of time. This means that the longest time-step should be of the order of a day. It is also desirable for the time-step to be sufficiently long so as not to interact with the turbulent wind, or with another controller that responds to turbulent wind such as a closed loop pitch controller or generator controller operating on a timescale of around 50 Hz. As such, time-steps should be 10 minutes or longer.

The time-step $\Delta T$ should therefore be between 10 minutes and one day in duration. Preferably the time-step is one hour or one day in duration.

The time-step $\Delta T_{LUE}$ differs from the time-step $\Delta T$ and is described below in more detail.

Figure 6:
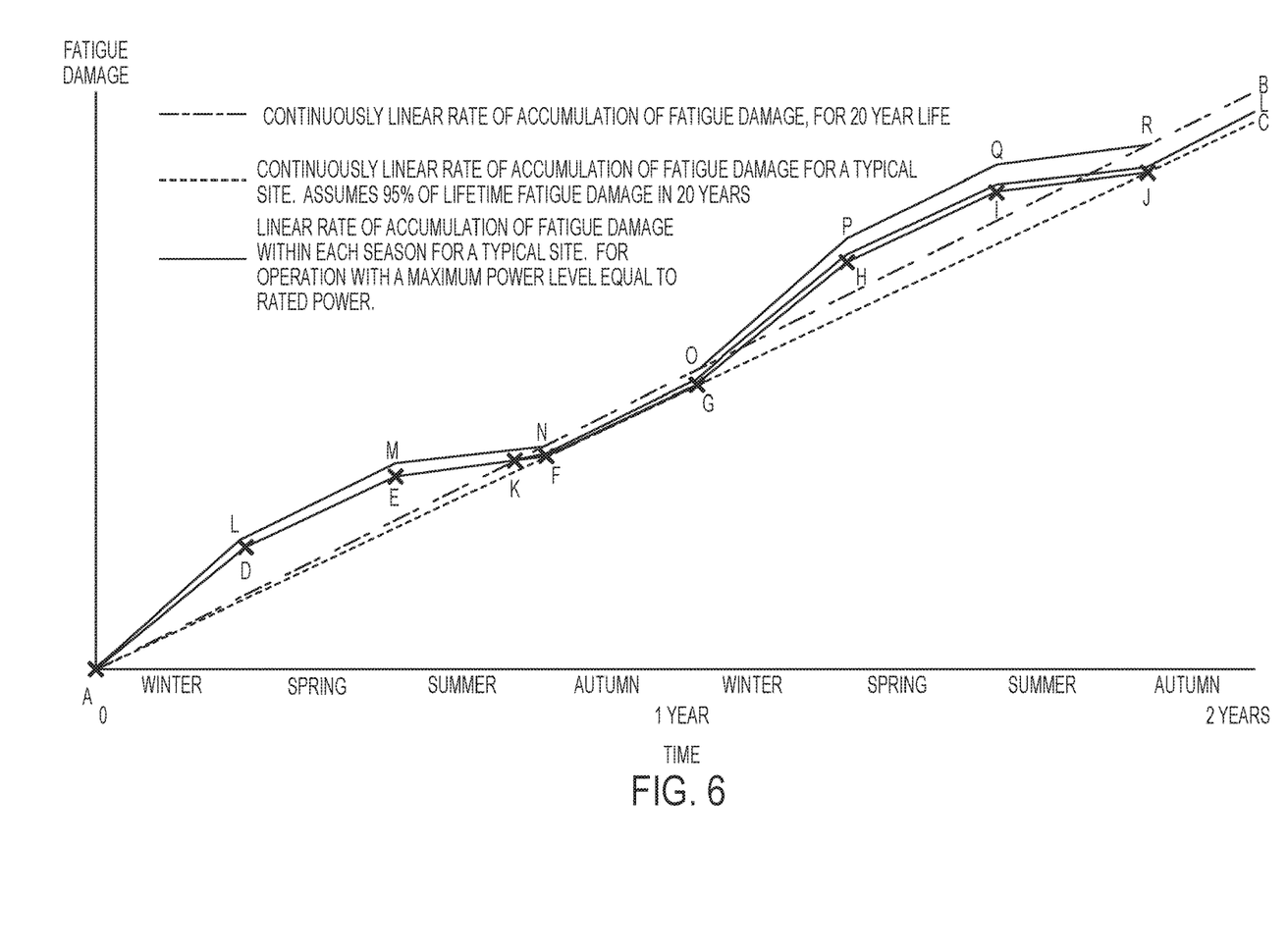
FIG. 6 is the graph of FIG. 3 with a further example plot of damage incurred when employing the controller of FIG. 4 as an over-rating controller.

FIG. 6 illustrates operation of a controller according to the first aspect of the invention overlaid on FIG. 3. The controller gives performance along the line A-L-M-N-O-P-Q-R-B. Again an approximately 15% higher rate of increase of fatigue damage, during winds of above-rated wind-speed, is assumed as for the simpler over-rating controller of FIG. 3, which responds only to a linear estimate of rate of accumulation of damage. Comparing the performance of the controllers of FIG. 3 and FIG. 6, the FIG. 3 controller is able to utilise only 1-2% additional fatigue damage at the end of year 1, and a similar number at the end of year 2 (point L), while the improved controller may be able to utilise an estimated 5% additional fatigue damage in both cases (points O and B). This means substantially higher energy capture from the controller in the early years of operation, with approximately three times as much extra energy capture from the over-rating over the simpler over-rating controller (an extra 2.5% instead of about 0.75%).

Whilst the controller is described above primarily for use with, or as part of, an overrating controller, it should be appreciated that the controller could be used with any control methodology that uses LUEs to trade off fatigue damage and power demand.

The controller may be implemented directly in a turbine controller. Alternatively, the controller may be implemented in a local site controller, such as a power plant controller, or may be implemented remotely, whereby the output of the controller is then applied to the turbine controller. The controller may, in some embodiments, be implemented as part of an over-rating controller, which controls the amount of over-rating applied to a wind turbine. In other embodiments the controller may be used to control de-rating of a turbine, reducing power below rated power using input from LUEs. The controllers, functions and logic elements described herein may be implemented as hardware components or software executing on one or more processors located at the wind turbines, the PPC or a remote location, or a combination thereof.

The controllers, functions and logic elements described herein may be implemented as hardware components or software executing on one or more processors located at the wind turbines, the PPC or a remote location, or a combination thereof.

It should be noted that embodiments of the invention may be applied to both constant-speed and variable-speed turbines. The turbine may employ active pitch control, whereby power limitation above rated wind speed is achieved by feathering, which involves rotating all or part of each blade to reduce the angle of attack. Alternatively, the turbine may employ active stall control, which achieves power limitation above rated wind speed by pitching the blades into stall, in the opposite direction of that used in active pitch control.

Lifetime Usage Estimators

The lifetime usage estimators will now be described in more detail.

The algorithm required to estimate lifetime usage will vary from component to component and the LUEs may comprise a library of LUE algorithms including some or all of the following: load duration, load revolution distribution, rainflow counting, stress cycle damage, temperature cycle damage, generator thermal reaction rate, transformer thermal reaction rate and bearing wear. Additionally other algorithms may be used. As mentioned above, lifetime usage estimation may only be used for selected key components and the use of a library of algorithms enables a new component to be selected for LUE and the suitable algorithm selected from the library and specific parameters set for that component part.

In one embodiment, LUEs are implemented for all major components of the turbine including the blade structure, the blade bearings and bolts, the blade pitch system, the main shaft and bearing system, the gearbox (including gear-tooth contact point, gearbox gear-tooth root bending and/or gearbox bearings), the generator (including windings, bearings and/or terminal box cables), the converter, the transformer (including transformer windings), the yaw system, the tower and the foundation. Alternatively a selection of one or more of these LUEs may be made.

As examples of the appropriate algorithms, rainflow counting may be used in the blade structure, blade bolts, pitch system, main shaft system, converter, yaw system, tower and foundation estimators. In the blade structure algorithm, the rainflow count is applied to the blade root bending flapwise and edgewise moment to identify the stress cycle range and mean values and the output is sent to the stress cycle damage algorithm. For the blade bolts, the rainflow count is applied to the bolt bending moment to identify stress cycle range and mean values and the output sent to the stress cycle damage algorithm. In the pitch system, main shaft system, tower and foundation estimators the rainflow counting algorithm is also applied to identify the stress cycle range and mean values and the output sent to the stress cycle damage algorithm. The parameters to which the rainflow algorithm is applied may include:

Pitch system—pitch force;
Main shaft system—main shaft torque;
Tower—tower stress;
Foundation—foundation stress.

In the yaw system the rainflow algorithm is applied to the tower top torsion to identify the load duration and this output is sent to the stress cycle damage algorithm. In the converter, generator power and RPM is used to infer the temperature and rainflow counting is used on this temperature to identify the temperature cycle and mean values.

Lifetime usage in the blade bearings may be monitored either by inputting blade flapwise load and pitch velocity as inputs to the load duration algorithm or to a bearing wear algorithm. For the gearbox, the load revolution duration is applied to the main shaft torque to calculate the lifetime used. For the generator, generator RPM is used to infer generator temperature which is used as an input to the thermal reaction rate generator algorithm. For the transformer, the transformer temperature is inferred from the power and ambient temperature to provide an input to the transformer thermal reaction rate algorithm.

Where possible it is preferred to use existing sensors to provide the inputs on which the algorithms operate. Thus, for example, it is common for wind turbines to measure directly the blade root bending edgewise and flapwise moment required for the blade structure, blade bearing and blade bolts estimators. For the pitch system, the pressure in a first chamber of the cylinder may be measured and the pressure in a second chamber inferred, enabling pitch force to be calculated. These are examples only and other parameters required as inputs may be measured directly or inferred from other available sensor outputs. For some parameters, it may be advantageous to use additional sensors if a value cannot be inferred with sufficient accuracy. The time step for sampling the LUE parameters, $\Delta T_{LUEn}$, may be typically from 10 ms up to 4 seconds.

The algorithms used for the various types of fatigue estimation are known and may be found in the following standards and texts:

Load Revolution Distribution and Load Duration:
Guidelines for the Certification of Wind Turbines, Germainischer Lloyd, Section 7.4.3.2 Fatigue Loads
Rainflow:
IEC 61400-1 'Wind turbines—Part 1: Design requirements, Annex G
Miners Summation:
IEC 61400-1 'Wind turbines—Part 1: Design requirements, Annex G
Power Law (Chemical Decay):
IEC 60076-12 'Power Transformers—Part 12: Loading guide for dry-type power transformers', Section 5.

The invention claimed is:

1. A method of controlling a wind turbine, the method comprising:
   determining a target fatigue life consumption for each of one or more components of the wind turbine;
   comparing the target fatigue life consumption with a measure of fatigue life consumption for each of the one or more turbine components; and
   controlling the turbine power output based upon the comparison; wherein:
   the target fatigue life consumption is determined by combining data indicative of a target rate of accumulation of fatigue damage over at least a portion of the operating life of the wind turbine and data indicative of an expected rate of accumulation of fatigue damage caused by seasonal variations in turbine operating conditions,
   the data indicative of an expected rate of accumulation of fatigue damage is obtained from a seasonal schedule defining the expected seasonal rates of accumulation of fatigue damage, and
   the seasonal schedule is derived from a combination of:
      historical site data for the site on which the wind turbine is located, and
      values from an output of one or more lifetime usage estimator algorithms.

2. A method according to claim 1 wherein controlling the turbine power output produced comprises controlling the power level to which the wind turbine is over-rated.

3. A method according to claim 2, further comprising reducing or preventing over-rating of the turbine if the measure of fatigue life consumption for a component is greater than the target fatigue life consumption for that component.

4. A method according to claim 1 wherein the data indicative of a target rate of accumulation of fatigue damage is obtained from a schedule defining the target rate of accumulation of fatigue damage for each of a plurality of periods of time over at least a portion of the operating life of the wind turbine.

5. A method according to claim 4 wherein each of the plurality of periods of time is a year, or a multiple thereof.

6. A method according to claim 4 wherein the schedule defining the target rate of accumulation of fatigue damage is determined by an operator.

7. A method according to claim 1 further comprising determining measures of the fatigue life consumed by the one or more turbine components by:
   obtaining one or more signals, or values of variables, that may be used to indicate the fatigue lifetime of the one or more wind turbine components from turbine sensors; and
   applying one or more lifetime usage estimator algorithms to the signals or values to determine measures of the fatigue life consumed for each of the turbine components.

8. A method according to claim 7 wherein the time-step for sampling the one or more signals, or values of variables, is between 10 ms and 4 seconds.

9. A method according to claim 1 wherein the seasonal schedule comprises expected values for variations in rates of accumulation of fatigue damage for each of a plurality of periods of time, the periods being the same duration, or shorter than, a season.

10. A method according to claim 1 wherein the seasonal schedule contains values indicating the percentage or fraction by which the target damage accumulation is increased or decreased for a given period of time depending upon seasonal variation.

11. A method according to claim 1 wherein the historical site data includes one or more of:
   wind speed, wind direction, turbulence intensity, air density, icing and site topography and terrain for the site or sites; and/or
   operating data for energy produced.

12. A method according to claim 1 wherein the method is initiated at a point in time after commissioning the wind turbine.

13. A method according to claim 12 wherein the historical site data includes one or more of:
   wind speed, wind direction, turbulence intensity, air density, icing and site topography and terrain for the site or sites after commissioning; and/or
   operating data for energy produced and other variables after commissioning.

14. A method according to claim 1 wherein the seasonal schedule is derived by combining the historical site data and the values from the output of the one or more lifetime usage estimator algorithms according to a predetermined weighting in which the historical site data is given a higher weighting during an initial period of the operational life and the output of the one or more lifetime usage estimator algorithms is given a higher weighting after the initial period.

15. A method according to claim 14 wherein the weighting towards the lifetime usage estimator values increases as additional output from the one or more lifetime usage estimator algorithms is obtained.

16. A method according to claim 1 wherein the historical site data is obtained prior to constructing, and/or prior to commissioning, the wind turbine or wind power plant.

17. A method according to claim 1 wherein determining a target fatigue life consumption for each of one or more components of the wind turbine and comparing the target fatigue life consumption with a measure of fatigue life consumption for each of the one or more turbine components is performed with a time-step of between 10 minutes and one day.

18. A method according to claim 17 wherein the time-step is one hour, or one day.

19. A controller for a wind turbine, the controller being configured to:
   determine a target fatigue life consumption for each of one or more components of the wind turbine;
   compare the target fatigue life consumption with a measure of fatigue life consumption for each of the one or more turbine components; and
   control the turbine power output based upon the comparison;
   wherein:
      the controller is configured to determine the target fatigue life consumption by combining data indicative of a target rate of accumulation of fatigue damage over at least a portion of the operating life of the wind turbine and data indicative of an expected rate of accumulation of fatigue damage caused by seasonal variations in turbine operating conditions,
      the data indicative of an expected rate of accumulation of fatigue damage is obtained from a seasonal schedule defining the expected seasonal rates of accumulation of fatigue damage, and
      the seasonal schedule is derived from a combination of:
         historical site data for the site on which the wind turbine is located, and
         values from an output of one or more lifetime usage estimator algorithms.

20. A controller for a wind power plant, the controller being configured to, for each of a plurality of wind turbines:
   determine a target fatigue life consumption for each of one or more components of the wind turbine;
   compare the target fatigue life consumption with a measure of fatigue life consumption for each of the one or more turbine components; and
   control the turbine power output based upon the comparison;
   wherein:
      the controller is configured to determine the target fatigue life consumption by combining data indicative of a target rate of accumulation of fatigue damage over at least a portion of the operating life of the wind turbine and data indicative of an expected rate of accumulation of fatigue damage caused by seasonal variations in turbine operating condition,
      the data indicative of an expected rate of accumulation of fatigue damage is obtained from a seasonal schedule defining the expected seasonal rates of accumulation of fatigue damage, and
      the seasonal schedule is derived from a combination of:
         historical site data for the site on which the wind turbine is located, and
         values from an output of one or more lifetime usage estimator algorithms.

* * * * *